United States Patent
Müller

(10) Patent No.: US 7,529,614 B1
(45) Date of Patent: May 5, 2009

(54) SYSTEM AND METHOD FOR TURBO COMPRESSOR RECIRCULATION VALVE CONTROL

(75) Inventor: Martin Müller, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/948,541

(22) Filed: Nov. 30, 2007

(51) Int. Cl.
F02B 37/00 (2006.01)
G06F 19/00 (2006.01)

(52) U.S. Cl. .................. 701/102; 123/559.1; 60/611

(58) Field of Classification Search .......... 701/102, 701/100, 101; 123/559.1; 60/606, 607, 611
See application file for complete search history.

(56) References Cited

U.S. PATENT DOCUMENTS

| | | | |
|---|---|---|---|
| 4,394,812 A | 7/1983 | Mezger | |
| 4,517,803 A | 5/1985 | Jamison | |
| 4,697,980 A | 10/1987 | Keyes, IV et al. | |
| 5,173,021 A | 12/1992 | Grainger et al. | |
| 5,355,677 A | 10/1994 | Hawkins et al. | |
| 5,533,487 A * | 7/1996 | Cailey | 123/568.17 |
| 5,819,538 A * | 10/1998 | Lawson, Jr. | 60/611 |
| 6,055,962 A * | 5/2000 | Kirk | 123/516 |
| 6,256,993 B1 | 7/2001 | Halimi et al. | |
| 6,298,718 B1 * | 10/2001 | Wang | 701/100 |
| 6,324,848 B1 | 12/2001 | Gladden et al. | |
| 6,327,980 B1 | 12/2001 | Chen et al. | |
| 6,601,388 B1 | 8/2003 | Gladden | |
| 6,813,887 B2 * | 11/2004 | Sumser et al. | 60/611 |
| 6,898,934 B1 | 5/2005 | Bayer et al. | |
| 7,089,738 B1 | 8/2006 | Boewe et al. | |
| 7,281,378 B2 | 10/2007 | Gu et al. | |
| 2005/0092949 A1 | 5/2005 | Wilhelm et al. | |
| 2005/0103012 A1 | 5/2005 | Bayer et al. | |
| 2006/0016187 A1 | 1/2006 | Swenson et al. | |
| 2007/0057213 A1 | 3/2007 | Noelle | |
| 2007/0074512 A1 | 4/2007 | Evers | |

FOREIGN PATENT DOCUMENTS

GB    2 268 228 A    1/1994
JP    2005226479    8/2005

OTHER PUBLICATIONS

U.S. Appl. No. 11/948,541, filed Nov. 30, 2007.

* cited by examiner

Primary Examiner—Hieu T Vo
(74) Attorney, Agent, or Firm—Paul L. Marshall

(57) ABSTRACT

A system and method for controlling a compressor recirculation valve involves establishing a compressor surge flow threshold expressed in terms of a compressor corrected volume air flow rate. A torque-based engine management system computes a desired mass air flow rate in accordance with a torque request and other operating/predetermined data. The desired mass air flow rate is converted into a desired, corrected volume air flow rate, which is then compared to the compressor surge flow threshold. The controller is configured to open the valve when the desired corrected volume air flow rate is less than the compressor surge flow threshold. A hysteresis function is implemented by providing a surge flow hysteresis threshold that is offset from and greater than the initial compressor surge flow threshold. The controller is configured to close the recirculation valve when the desired corrected volume air flow rate becomes greater than the surge flow hysteresis threshold.

11 Claims, 2 Drawing Sheets

SYSTEM AND METHOD FOR TURBO COMPRESSOR RECIRCULATION VALVE CONTROL

TECHNICAL FIELD

The present invention relates to a system and method for turbo compressor recirculation valve control.

BACK GROUND OF THE INVENTION turbo-charged internal combustion engine includes additional components and physical processes in both the intake and exhaust stream. On the intake side of the engine, a centrifugal compressor and intercooler are provided and are located between the air cleaner and a throttle valve. There is typically a recirculation path that is controlled by a recirculation valve coupled between the outlet and the inlet of the compressor. The purpose of the recirculation valve is that it can be opened during tip-out (i.e., where an operator of an automotive vehicle lifts off the acceleration pedal causing the throttle valve to close). The opening of the recirculation valve is intended to avoid compressor surge and large boost pressure spikes that would otherwise occur in the volume between the compressor and the throttle. The pressure spike is caused by the column of air being decelerated due to the sudden blockage by the throttle valve, while the compressor at the other end of the volume does not allow for any pressure dispersion. A tip-out without compressor recirculation would cause a condition of low compressor flow and high compressor pressure ratio, which would bring the compressor into a surge region of operation. Compressor operation in the surge region is unstable because the pressure ratio is too large for the small flow rate, causing flow reversal and an associated temporary pressure drop. The temporary pressure drop allows the flow to reestablish itself. However, the cycling between these opposite processes typically happens at a high frequency causing unpleasant NVH and compressor longevity issues. Furthermore, surge can cause the turbo-charger speed to drop rapidly, which may impair responsiveness on a subsequent tip-in.

As to control of the recirculation valve, it is known to measure the compressor inlet and outlet pressures (i.e., to compute a compressor pressure ratio) as well as the air flow through the compressor and open the recirculation valve when such measured conditions indicate operation in the surge region. However, one disadvantage of such an approach is a lag time after commanding the recirculation valve to open until the time when the valve actually opens and begins to have the desired effect. Other approaches based on real-time measurements have the same shortcoming to one degree or another.

There is therefore a need for a system and method for controlling a recirculation valve of a turbo-charged engine system that minimizes or eliminates one or more of the problems set forth above.

SUMMARY OF THE INVENTION

The present invention provides for improved control logic for opening and closing a compressor recirculation valve. Embodiments of the invention will be inherently more stable since they will use predictive values available from a conventional torque-based engine management system (EMS). Additionally, since the decision logic uses predictive values from the EMS, the time for commanding the valve to open can be advanced relative to conventional approaches, which can more effectively prevent surge and boost pressure spikes or minimize its effects. Embodiments of the invention will also be significantly easier to implement as they will utilize compressor characteristics data (map) typically provided by turbo-charger manufacturers. Moreover, embodiments of the invention will automatically incorporate altitude compensation.

method is provided for controlling an internal combustion engine system including a turbo-charger having a compressor with a parallel recirculation path adjusted by a recirculation valve and an exhaust driven turbine. The method comprises a number of steps. The first step involves establishing a compressor surge flow threshold, which in a preferred embodiment is a corrected volume air flow rate for a particular compressor pressure ratio. The next step involves determining a desired corrected volume air flow rate based on a desired mass air flow rate. In a preferred embodiment, the desired mass air flow rate is already available in a conventional torque-based engine management system (EMS). Moreover, it warrants emphasizing that the desired corrected volume air flow rate is predictive/prospective (i.e., it is the flow rate that the system seeks to control to). Finally, the last step involves opening the recirculation valve when the desired corrected volume air flow rate is less than the compressor surge flow threshold.

In a preferred embodiment, hysteresis is added wherein the desired corrected volume air flow rate must be greater than a surge flow hysteresis threshold before the recirculation valve is closed.

Other features, object and advantages of the present invention are also presented.

BRIEF DESCRIPTION OF THE DRAWINGS

The present invention will now be described by way of example, with reference to the accompanying drawings:

FIG. 4 is a flow chart diagram showing a method for recirculation valve control according to the present invention.

DETAILED DESCRIPTION OF THE PREFERRED EMBODIMENT

Figure 1:
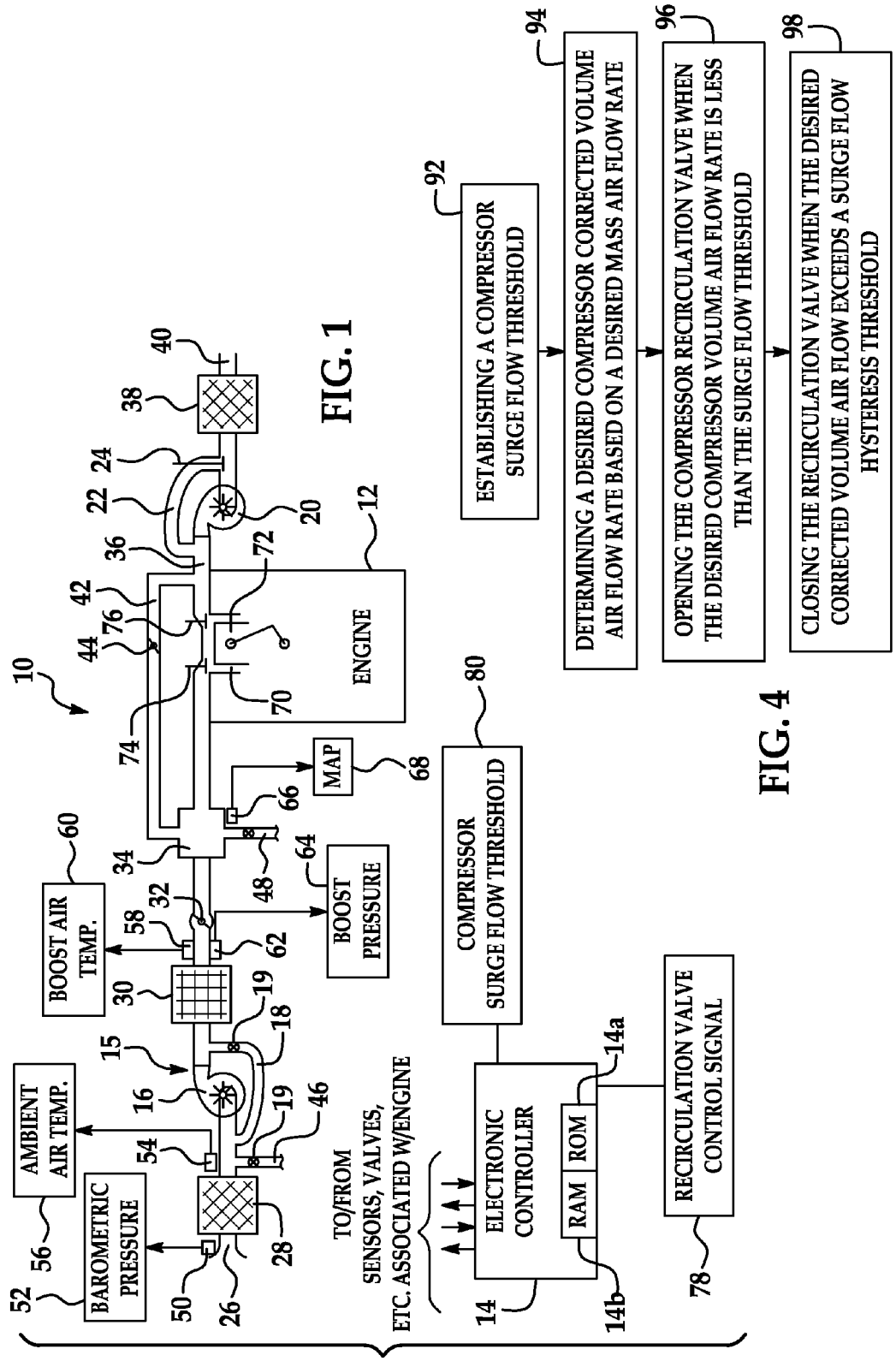
FIG. 1 is simplified diagrammatic and block diagram of a turbo-charged engine system having a controller configured for compressor recirculation valve control.

Referring now to the drawings wherein like reference numerals are used to identify identical components in the various views, FIG. 1 is a diagrammatic view of a turbo-charged internal combustion engine system 10 configured in accordance with the present invention. The system 10 includes an internal combustion engine 12 controlled by an electronic engine controller 14. Engine 12 may be a spark-ignition engine that includes a number of base engine components, sensing devices, output systems and devices, and a control system. Alternatively, the present invention may be used with compression-ignition engines, such as diesel or the like.

Generally, electronic controller 14 is configured via suitable programming to contain various software algorithms and calibrations, electrically connected and responsive to a plurality of engine and vehicle sensors, and operably connected to a plurality of output devices. Controller 14 includes at least one microprocessor or other processing unit, associated memory devices such as read only memory (ROM) 14a and random access memory (RAM) 14b, input devices for monitoring input from external analog and digital devices, and output drivers for controlling output devices. In general, controller 14 is operable to monitor engine operating conditions and operator inputs using the plurality of sensors, and control engine operations with the plurality of output systems and actuators, using pre-established algorithms and calibrations that integrate information from monitored conditions and inputs. The software algorithms and calibrations which are executed in electronic controller 14 may generally comprise conventional strategies known to those of ordinary skill in the art. The software algorithms and calibrations are preferably embodied in pre-programmed data stored for use by controller 14. Overall, in response to the various inputs, the controller 14 develops the necessary outputs to control the throttle, fuel, spark, EGR and other aspects, all as known in the art.

System 10 further includes a turbo-charger 15 having a compressor 16, which may include a parallel recirculation flow path 18 that is controlled by a compressor recirculation valve 19, and an exhaust gas driven turbine 20, which includes a parallel waste-gate flow path 22. More specifically, the compressor recirculation flow path 18 couples the outlet of the compressor 16 to the inlet of the compressor 16. As also known, the compressor is driven by the turbine, and the amount of boost is controlled principally by a waste-gate control mechanism (e.g., valve) shown schematically as a waste-gate valve 24.

The compressor recirculation valve 19 is controlled between open and closed positions in accordance with a recirculation valve control signal 78 produced by the controller 14. As described in the Background, the controller 14 may be configured to open the recirculation valve 19 during tip-out (i.e., where an operator of an automotive vehicle lifts off the acceleration pedal). The opening of the recirculation valve 19 is intended to avoid compressor surge and large boost pressure spikes that would otherwise occur in the volume between the compressor 16 and the throttle 32. Such a pressure spike is caused, in conventional systems, by the column of air being decelerated due to the sudden blockage by the throttle valve 32, while the compressor 16 at the other end of the volume does not allow for any pressure dispersion. Furthermore, tip-out without compressor recirculation may cause a condition of low compressor flow and high compressor pressure ratio, which would bring the operation of the compressor 16 into a so-called surge region. As described in the Background, operation in the surge region is unstable because the pressure ratio is too large for the small flow rate, causing flow reversal and an associated temporary pressure drop, and accompanying high frequency cycling. As will be described in more detail below, the present invention provides a method for determining when to command the recirculation valve 19 to be opened so as to more effectively prevent surge or minimize its effects.

The present invention is suitable for use with any one of several types of compressor recirculation hardware, which may include pneumatically-actuated recirculation valves—both pressure and vacuum—as well as electrically-operated solenoid recirculation valves built into the compressor housing.

With continued reference to FIG. 1, on the air intake side of the engine 12, there is shown an air intake port 26, an air filter 28, an intercooler 30 configured to cooperate with and complement the compressor 16, a throttle valve 32, and an intake manifold 34. These features are well known and understood in the art. In the context of the present invention, these features may comprise conventional implementations.

On the exhaust side of the engine 12, FIG. 1 shows an exhaust gas manifold 36. Additionally, various downstream exhaust components are conventionally included in system 10, such as a catalytic converter and a muffler, and are shown schematically as a single exhaust restriction block 38, which feeds into exhaust gas outlet 40. These features are well known and understood in the art. In the context of the present invention, these features may comprise conventional implementations.

Conventionally, a variety of feedback paths are provided in system 10. For example, FIG. 1 shows an exhaust gas recirculation (EGR) tube or the like coupled between the exhaust manifold 36 and the intake manifold 34, and whose flow path is adjusted by way of an EGR valve 44. As known, the EGR valve 44 may be controlled by the electronic controller 14 in accordance with conventional EGR algorithms configured to achieve predetermined performance criteria. Generally, varying the position of the valve 44 alters the amount of exhaust gas that is provided to the intake manifold 34 for mixing with intake air, fuel and the like destined for combustion in engine 12.

With continued reference to FIG. 1, additional feeds may also be provided. For example, evaporative emissions control and diagnostics generally call for an evaporative ("evap") emissions canister (not shown) be provided in an automotive vehicle that includes system 10. The evap canister is coupled to a fuel tank (not shown) as well as to inlets 46 and 48 by a combination of vent, purge and check valves, all as known in the art.

FIG. 1 also shows a variety of sensors typically deployed on the intake side of the engine 12, including an ambient or barometric pressure sensor 50 configured to produce a barometric pressure signal 52, an ambient air temperature sensor such as an intake air temperature (IAT) sensor 54 configured to generate an IAT signal 56, a boost air temperature sensor 58 configured to generate a boost air temperature signal 60, a boost pressure sensor 62 configured to generate a boost pressure signal 64, and an intake manifold pressure sensor such as a manifold absolute pressure (MAP) sensor 66 configured to generate a MAP signal 68. These sensors and their functioning are all well known and understood in the art. For purposes of the present invention, these sensors may all comprise conventional components.

System 10 also includes capabilities for determining a value for the mass air flow, which may be obtained either via measurement by an air meter (e.g., mass air flow sensor or MAF sensor-not shown) typically placed just upstream of the compressor 16, or, in an alternate embodiment, calculated by the well known speed-density equation, for example as set forth in U.S. Pat. No. 6,393,903 entitled VOLUMETRIC EFFICIENCY COMPENSATION FOR DUAL INDEPENDENT CONTINUOUSLY VARIABLE CAM PHASING to Reed et al., assigned to the common assignee of the present invention, and incorporated herein by reference in its entirety.

The controller 14, as described above, is configured generally to control the operation of the engine system, and accordingly is configured to control air, fuel, spark (for spark-ignition embodiments) as well as other aspects affecting the operation of the engine system. In this regard, the controller 14 is specifically configured to include an engine management system (i.e., EMS in the controller 14) which preferably implements a so-called torque-based engine control. A torque control structure programmed in the controller 14 is configured generally to translate a driver torque request into the desired engine mass airflow (i.e., a mass air flow that will also flow through the compressor of the turbo-charger). An air control structure will translate the air flow into a desired intake manifold pressure, and ultimately decide the appropriate throttle position. The art teaches a wide variety of torque-based control strategies suitable for programmed execution in a controller such as the controller 14, which ultimately produce a desired mass air flow value to achieve a desired torque.

method of the present invention leverages off of this advanced determination of the desired mass airflow to predict a potential surge condition, and to open the recirculation valve at an earlier time than conventional systems. The controller 14 is configured to generate a compressor recirculation valve control signal 78 to open or close the recirculation valve 19 in accordance with the open and close logic to be described herein. The open and close logic of the controller 14 is configured to make use of both (1) the desired mass air flow rate determined pursuant to a suitable torque-based control, which is thereafter preferably converted to a volume air flow rate at standard conditions (i.e., a corrected volume air flow rate), and, in addition, (2) a compressor surge flow threshold, preferably implemented in the form of a table 80. The table 80 contains predetermined compressor characteristics data, particularly the corrected volume air flow rates versus pressure ratio data that specifies the conditions under which the compressor may enter the surge region of operation.

Figure 2:
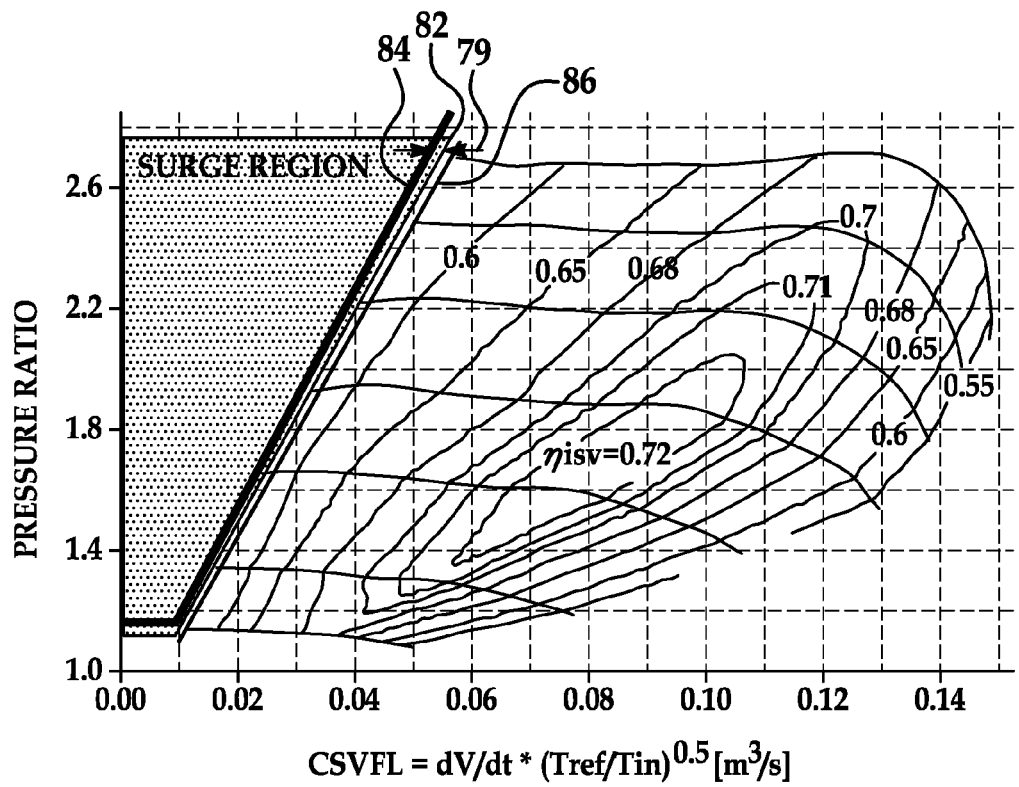
FIG. 2 is a compressor characteristics map showing not only a conventionally defined surge region but also showing a compressor surge flow threshold line and a surge flow hysteresis line.

FIG. 2 illustrates an operating characteristics map for a compressor, such as the compressor 16. As background, it is common practice for manufacturers of turbo-chargers to make one or more of the following pieces of data available: $\dot{V}_{C,cor}$, $Pr_C$, $\dot{N}_{T,cor}$, $\eta_C$ at a specified $T_{C,in}^{reference}$, $P_{C,in}^{reference}$, where $\dot{V}_{C,cor}$ is the corrected compressor volume flow rate, $\dot{N}_{T,Corr}$ is the corrected turbo-charger rotational speed and $T_{C,in}^{reference}$, $P_{C,in}^{reference}$ are the reference compressor inlet air stagnation temperature and reference compressor inlet air stagnation pressure, respectively. As used herein, a compressor corrected volume air flow rate means the compressor volume air flow rate at standard conditions, as known. For brevity, corrected volume air flow rate may be used herein.

This data is what is referred to herein as the compressor characteristics map. A turbo-charger manufacturer may provide a map/diagram that graphically illustrates the compressor isentropic efficiency $\eta_C$ (e.g., as rings or partial rings indicating various efficiency levels such as 50%, 60%, 70%, 72%, 75%, etc.) on an X-Y chart where the X-axis is the corrected volume air flow rate and the Y-axis is the compressor pressure ratio. FIG. 2 illustrates a subset of the total data mentioned above, particularly illustrating the isentropic efficiency data as a function of the corrected volume air flow rate and pressure ratio. Additionally, however, FIG. 2 also shows a so-called compressor "Surge Region" of operation, characterized by low volume flow rates at heightened pressure ratios, as described generally in the Background. Typically, a surge line 82 is also included in the data from the manufacturer and segregates the surge region from the normal operating region.

In one embodiment, the table 80 is populated with data corresponding to a line 84 that is offset by a predetermined margin 79 (i.e., to the left in FIG. 2) from the true surge line 82. Table 80 thus contains data pairs for corrected volume air flow rate/pressure ratio that collectively define the compressor surge flow threshold line 84. In addition, the controller 14 may be configured with a predetermined hysteresis value, which is a value that is added to the compressor surge flow threshold "line" (i.e., the data in the table 80) to produce a surge flow hysteresis threshold "line" 86. While the hysteresis value may be implemented as a predetermined constant, alternatively, the surge flow hysteresis "line" may be defined by a plurality of data pairs just like the compressor surge flow threshold line 84 and stored in either the table 80 or in an additional data table. Other variations are possible. Once the recirculation valve 19 has been opened, due to the desired volume flow rate being less than the corresponding compressor surge flow threshold (line 84), the controller 14 will maintain the valve 19 closed until the desired volume flow rate becomes greater than the surge flow hysteresis line 86. The difference between the compressor surge flow threshold line 84 and the surge flow hysteresis line 86 defines a hysteresis band. Common to these embodiments is that in the end, a pair of "lines", one below and one above the true surge line 82, is established that respectively define when to open (line 84) and when to close (line 86) the valve 19.

As to the compressor characteristics map, it should be understood that other forms of data or information may be available, including without limitation data in electronic format. Moreover, while it is preferred, due to convenience primarily, that such manufacturer-provided data concerning the compressor be used, it should be understood that independent measurements and characterization of the compressor of a turbo-charger may be employed to obtain the same information as described above, without any limitation of the present invention.

Figure 3:
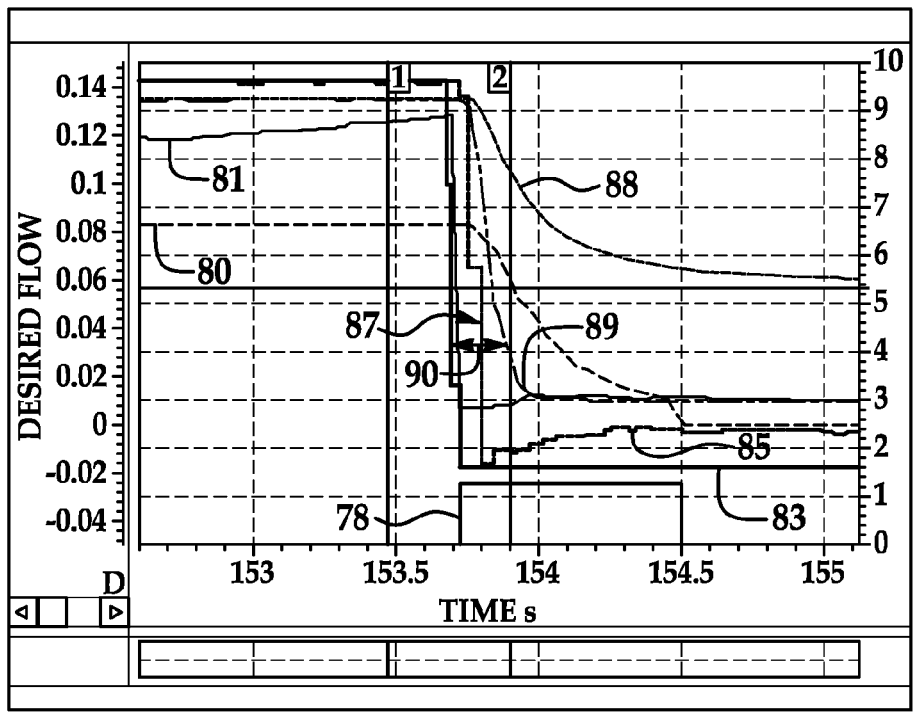
FIG. 3 is a timing diagram showing the response of a system during tip-out, particularly the lead times provided by the invention.

FIG. 3 is a timing diagram showing the lead time advantages in detecting possible compressor surge provided by the present invention. FIG. 3, for the sake of completeness, shows data for a tip-out obtained from a hardware configuration where the recirculation valve was located just downstream of the compressor outlet. FIG. 3 shows a number of traces: trace 78 corresponds to and thus bears the same reference number as the compressor recirculation valve control signal 78 shown in FIG. 1; trace 80 corresponds to and thus bears the same reference number as the compressor surge flow threshold data taken from table 80 shown in FIG. 1; trace 81 is the desired corrected volume air flow rate as converted from a desired mass air flow rate generated by a torque-based control engine management system (EMS) based on requested torque and other parameters understood in the art; trace 83 is the desired throttle position as also generated by the EMS; trace 85 is the actual (indicated) throttle position as from a throttle position sensor (TPS); the gap 87 represents an advance in time after detection of a possible surge condition to before the throttle valve actually begins to move; trace 88 is the throttle inlet pressure (e.g., as taken from boost pressure signal 64); trace 89 is the throttle outlet pressure; and the gap 90 represents the advance in time after detection of possible surge to before the pressure level in the intake manifold actually begins to fall (as would be predicted for a tip-out). As shown, the lead time possible from using the predictive information, in the form of a desired corrected volume air flow rate from the torque based EMS system, is apparent. The recirculation valve 19 can be commanded to be opened earlier—as soon as the desired, corrected volume air flow rate is less than the compressor surge flow threshold 84. In this way, the recirculation can be scheduled (commanded) open before the events (e.g., throttle valve closing) that could cause compressor surge to occur.

FIG. 4 is a flowchart illustrating the method of the present invention. It is contemplated that this methodology is performed periodically within an overall loop (i.e., performed every predetermined time interval). The method begins in step 92.

In step 92, the controller 14 is configured to establish a compressor surge flow threshold. This step may be implemented by obtaining a value from data table 80 based on the prevailing compressor pressure ratio (outlet pressure/inlet pressure). As described above, the surge flow data table 80 contains the corrected volume air flow rate/compressor pressure ratio data pairs that define the compressor surge flow threshold line 82 (see FIG. 2 which graphically illustrates this relationship). Thus, for any particular compressor pressure ratio, a compressor surge flow threshold value, preferably expressed in units of corrected volume air flow rate, can be obtained from the data table 80. The method proceeds to step 94.

In step 94, the controller 14 is configured to determined a desired compressor volume flow rate based on a desired mass air flow rate. The desired mass air flow rate is conventionally computed by a torque control-based engine management system, as described above, configured to achieve a desired torque. The controller 14 takes the desired mass air flow rate and converts it to the desired, corrected volume air flow rate in accordance with known relationships, such as equation (1) below:

$$\dot{V}_{C,cor}^{des} = \dot{m}_{air}^{des} * \frac{R*T_{C,in}}{P_{C,in}} * \sqrt{\frac{T_{C,in}^{reference}}{T_{C,in}}}$$

Where
$\dot{V}_{C,cor}^{des}$=desired corrected compressor volume flow rate;
$\dot{m}_{air}^{des}$=desired air mass;
$T_{C,in}$=Compressor inlet temperature;
$P_{C,in}$=Compressor inlet pressure;
$T_{C,in}^{reference}$=Compressor reference inlet temperature;
$P_{C,in}^{reference}$=Compressor reference inlet pressure; and
R=Ideal Gas Constant.

The benefit of converting the desired mass air flow rate into a desired, corrected volume air flow rate is that the compressor characteristics data typically provided by the turbocharger manufacturers are generally expressed in those terms (i.e., corrected volume air flow rate). This correspondence makes calibration much easier. Furthermore, this ensures correct operation at all ambient conditions and therefore all altitudes. It should also be emphasized that at the point in time that step 94 is performed, the desired corrected volume air flow rate is predictive in nature (i.e., it is the flow rate that the control system in seeking to achieve).

In an alternate embodiment, the engine management system (EMS) in controller 14 is of the type that is non-torque control based, as known in the art. In such embodiments, the EMS is responsive to a throttle-valve position signal in producing a desired mass air flow. The desired mass air flow is then converted and used as described above. However, it can be seen in FIG. 3 that in such an alternate embodiment, the lead time associated with the change in the throttle valve position is lost, relative to a torque control based embodiment, since the closure of the throttle valve itself becomes the driving input. Nonetheless, such non-torque control embodiments still exhibit the advantage of providing a capability of commanding the compressor recirculation valve open in advance of the manifold vacuum change. Accordingly, such embodiments remain predictive at least with respect to corrected volume air flow rate. Therefore, in this regard, such embodiments still represent an improvement over conventional systems. The method then proceeds to step 96.

In step 96, the controller 14 is configured to open the compressor recirculation valve when the desired, corrected volume air flow rate (step 94) is less than the compressor surge flow threshold (set in step 92). In this regard, controller 14 may be arranged to assert the recirculation valve control signal 78, for example as shown as trace 78 in FIG. 3. The particular implementing structure is responsive to the control signal 78 to open the valve 19. How the control signal 78 is actually used will depend on the recirculation valve hardware type (pneumatic, such as pressure or vacuum, or electrically-actuated). The method then proceeds to step 98.

In step 98, as an additional step in the method, once the valve 19 has been opened, the controller 14 is further configured to close the compressor recirculation valve 19 only when the desired, corrected volume air flow rate becomes larger than the surge flow hysteresis value, shown as line 86 in FIG. 2, which may be determined as described above in connection with FIG. 1.

In sum, the compressor recirculation valve control logic provides improved performance due to it being based on a predictive air flow parameter, is also more stable, easier to implement (i.e., due to calibration data provided by the turbo manufacturer), and automatically incorporates altitude compensation since it works in the units of relevance to the compressor characteristics (e.g., $\dot{V}_{C,cor}$, $\dot{N}_{T,cor}$, etc.).

It should be understood that electronic controller 14 as described above may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

It is also to be understood that the above description is merely exemplary rather than limiting in nature, the invention being limited only by the appended claims. Various modifications and changes may be made thereto by one of ordinary skill in the art, which embody the principles of the invention and fall within the spirit and scope thereof.

The invention claimed is:

1. A method of controlling an internal combustion engine system including a turbo-charger having a compressor with a parallel recirculation path adjusted by a recirculation valve and an exhaust driven turbine, comprising the steps of:
    establishing a compressor surge flow threshold;
    determining a desired compressor corrected volume air flow rate based on a desired mass air flow rate; and
    opening the recirculation valve when the desired corrected volume air flow rate falls below the compressor surge flow threshold.

2. The method of claim 1 wherein the compressor surge flow threshold is a first compressor surge flow threshold, said method further including the step of closing the recirculation valve when the desired corrected volume air flow rate exceeds a second compressor surge flow threshold wherein a difference between the first and second compressor surge flow thresholds define a hysteresis band.

3. The method of claim 1 said step of establishing the compressor surge flow threshold includes the sub-steps of:
    setting a baseline using predetermined compressor characteristic data corresponding to a corrected volume air flow rate versus pressure ratio surge line;

selecting a predetermined margin;
calculating the compressor surge flow threshold based on the baseline and the predetermined margin.

4. The method of claim 1 wherein said step of determining a desired corrected volume air flow rate includes the sub-step of:
converting the desired mass air flow rate into the desired corrected volume air flow rate.

5. The method of claim 1 wherein the desired mass air flow rate is computed by a torque control engine management system configured to achieve a desired torque output by the engine system.

6. The method of claim 1 wherein the desired mass air flow rate is computed by a non-torque control engine management system based on a throttle valve position.

7. The method of claim 1 said step of establishing the compressor surge flow threshold includes the sub-steps of:
setting a baseline using predetermined compressor characteristic data corresponding to a corrected volume air flow rate versus pressure ratio surge line;
selecting a predetermined margin;
calculating the compressor surge flow threshold based on the baseline and the predetermined margin.

8. A method of controlling an internal combustion engine system including a turbo-charger having a compressor with a parallel recirculation path adjusted by a recirculation valve and an exhaust driven turbine, comprising the steps of:
establishing a compressor surge flow threshold;
determining a desired compressor corrected volume air flow rate based on a desired mass air flow rate; and
closing the recirculation valve when the desired corrected volume air flow rate exceeds the compressor surge flow threshold.

9. The method of claim 8 wherein said step of determining a desired corrected volume air flow rate includes the sub-step of:
converting the desired mass air flow rate to the desired corrected volume air flow rate.

10. The method of claim 8 wherein the desired mass air flow rate is computed by a torque control engine management system configured to achieve a desired torque output by the engine system.

11. The method of claim 8 wherein the desired mass air flow rate is computed by a non-torque control engine management system based on a throttle valve position.

* * * * *